(No Model.) 3 Sheets—Sheet 1.

C. R. MILLER.
GAS GENERATOR.

No. 595,857. Patented Dec. 21, 1897.

WITNESSES:
F. E. Gaither
Chas. F. Miller

INVENTOR,
Commodore R. Miller
by George H. Christy
Att'y.

(No Model.)  3 Sheets—Sheet 2.

C. R. MILLER.
GAS GENERATOR.

No. 595,857. Patented Dec. 21, 1897.

WITNESSES:
F. E. Gaither.
Chas. F. Miller.

INVENTOR,
Commodore R. Miller
by George H. Christy
Att'y.

(No Model.) 3 Sheets—Sheet 3.

C. R. MILLER.
GAS GENERATOR.

No. 595,857. Patented Dec. 21, 1897.

WITNESSES:
F. E. Gaither
Chas. F. Miller

INVENTOR,
Commodore R. Miller
by George H. Christy
Att'y.

UNITED STATES PATENT OFFICE.

COMMODORE R. MILLER, OF PITTSBURG, PENNSYLVANIA, ASSIGNOR, BY MESNE ASSIGNMENTS, TO THE W. J. McCLURG GAS CONSTRUCTION COMPANY, OF SAME PLACE.

GAS-GENERATOR.

SPECIFICATION forming part of Letters Patent No. 595,857, dated December 21, 1897.

Application filed March 17, 1894. Serial No. 504,033. (No model.)

*To all whom it may concern:*

Be it known that I, COMMODORE R. MILLER, a citizen of the United States, residing at Pittsburg, in the county of Allegheny and State of Pennsylvania, have invented or discovered certain new and useful Improvements in Gas-Generators, of which improvements the following is a specification.

The invention herein described relates to certain improvements in apparatus for the production of gas.

In Letters Patent No. 494,012, dated March 21, 1893, is described a form of apparatus for the production of gas consisting of two shafts or chambers provided with zigzag baffle-plates along which oil flows in one direction, while gases generated by the decomposition of steam passing through highly-heated coke traverse the plates in the opposite direction.

The object of the present invention is to provide for the utilization of the heat of the gases and products of combustion passing through the fixing-chambers for the distillation of coal, thereby producing not only gases adapted for use for illumination and other purposes, but also coke, which is used in the production of gas.

In general terms the invention consists in the construction and combination substantially as hereinafter more fully described and particularly claimed.

Figure 1:
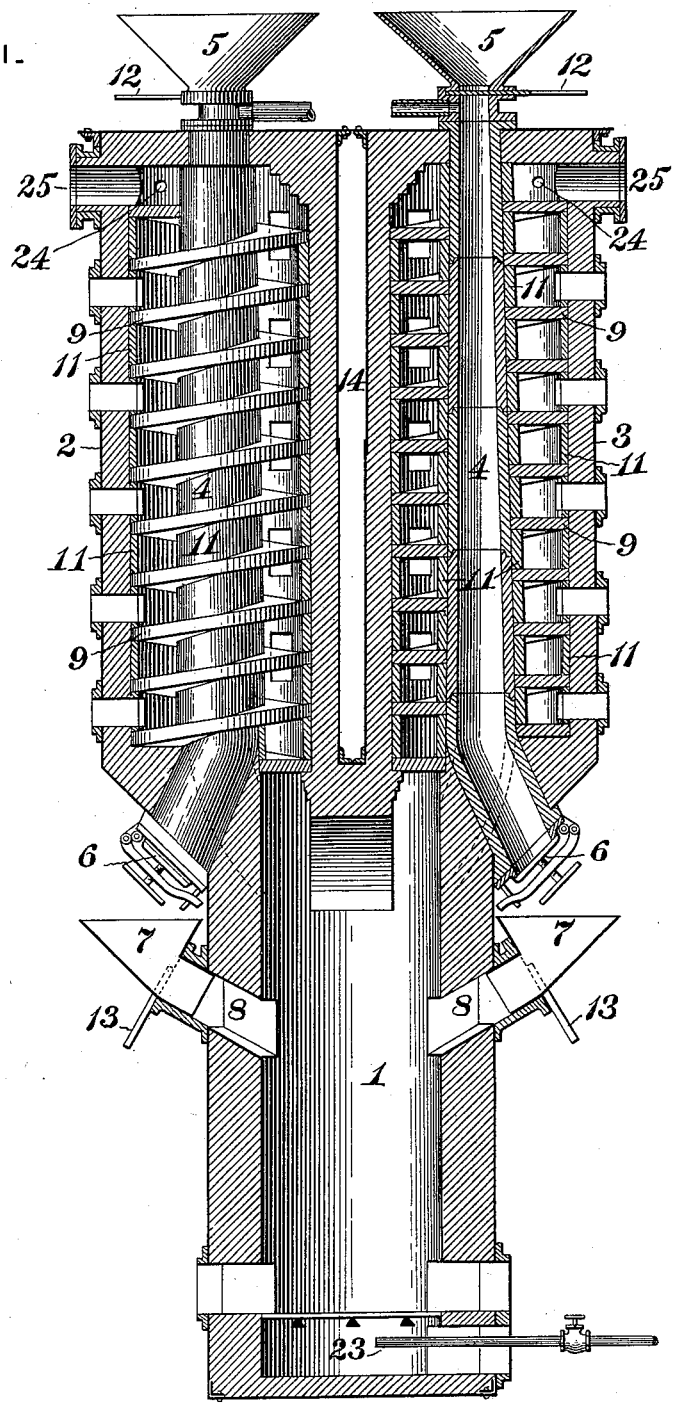
Figure 2:
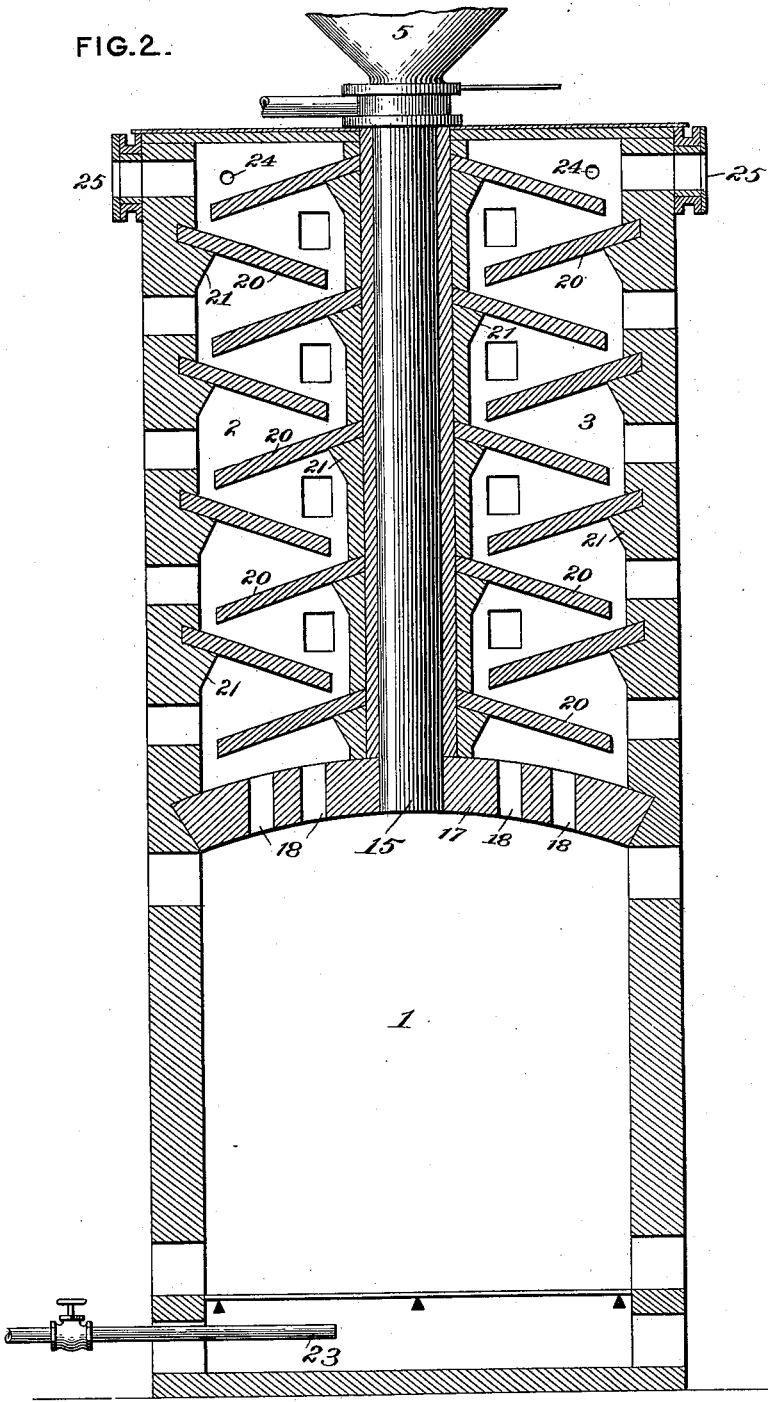
Figure 4:
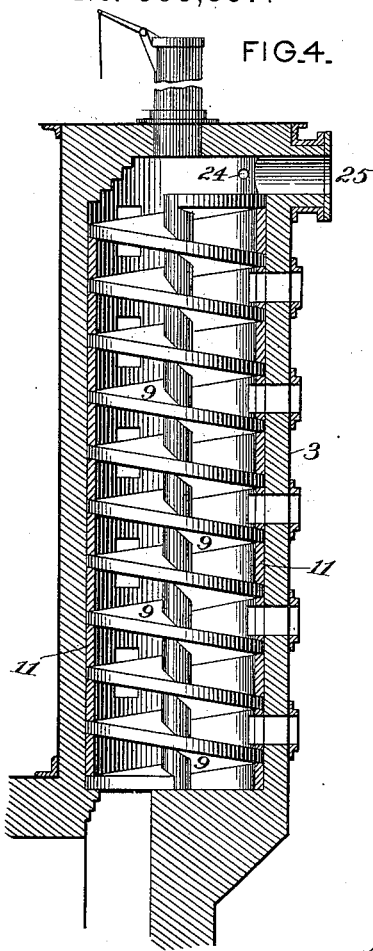
Figure 3:
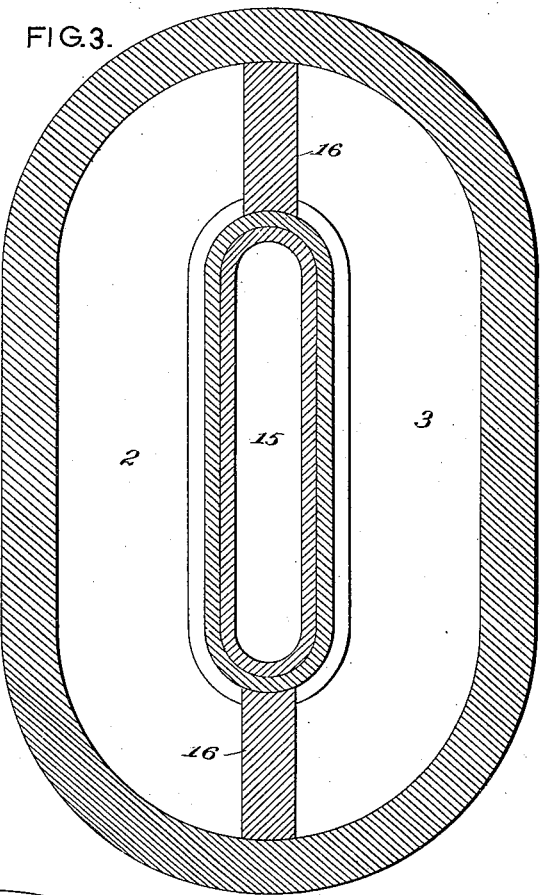
Figure 5:
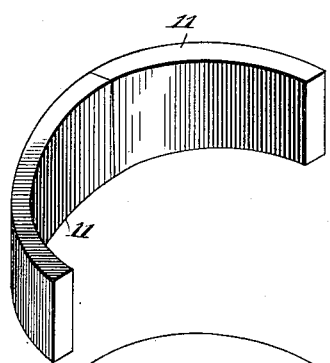
Figure 6:
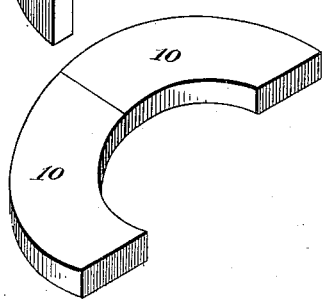

In the accompanying drawings, forming a part of this specification, Figure 1 is a sectional elevation of a producer constructed in accordance with my invention. Fig. 2 is a similar view of a modified form of the same. Fig. 3 is a sectional plan. Fig. 4 is a sectional elevation of a further modification of the construction shown in Fig. 1, and Figs. 5 and 6 are detail views.

My improved producer consists of the fire-chamber 1, in which is maintained a deep bed of coke, and the fixing-chambers 2 and 3. Within the chambers or compartments 2 and 3 are arranged retorts 4, which extend entirely through the chambers and are provided at their upper ends with charging-hoppers 5, and their lower ends, extending, as shown in Fig. 1, outside of the chambers, are provided with suitable closing devices 6. Immediately below the lower ends of the retorts are arranged hoppers 7, connected by passages 8 with the interior of the fire-chamber and adapted to receive coke as it is discharged from the retorts and direct it into the fire-chamber.

A spiral passage or conduit is formed in each of the chambers 2 and 3 by a continuous vane 9, arranged spirally around the retort and extending transversely from the exterior wall of the retort to the interior wall of the chamber. This vane or spiral partition consists of a series of sections 10, as shown in Fig. 6, formed of fire-clay or other material capable of withstanding a high heat. The outer and inner edges of the sections 10 are supported by curved tiles 11, (shown in Figs. 1 and 5,) which in turn are supported by the sections forming the turn of the spiral next below. This construction and arrangement permit of the quick and easy removal and replacement of the vanes.

The hoppers 5 and 7 are provided with closing-slides 12 and 13, respectively, to prevent the escape of gases from the retort and fire-chamber.

It will be noticed that in the construction shown in Fig. 1 the chambers 2 and 3 are formed in separate structures and that the side walls of the recess 14 between said structures are lined with sheet metal to prevent the percolation of oil through the walls of the chamber into the recess.

As shown in Figs. 2 and 3, the chambers 2 and 3 may be formed on opposite sides of a single retort 15. The producer is preferably made oval in cross-section, as shown in Fig. 3, and divided into two chambers by a similarly-shaped retort arranged centrally in the producer above the fire-chamber and the wing-walls 16, extending from the sides of the retort, preferably in planes corresponding approximately to the major axis of the retort and producer. The lower end of the retort 15 is supported by an arch 17, forming the top of the fire-chamber 1, which is placed in communication with the chambers 2 and 3 by ports 18, formed through the arch 17.

The baffle-plates 20 are arranged in zigzag order and are supported by corbels 21 on the side walls of the chambers 2 and 3.

The tortuous or spiral passages formed by the vanes 9 afford a very large surface for the vaporization of the oil in one of the chambers and the fixing of the gases in the other chamber. This construction can be employed without the coking-retort, if desired, as shown in Fig. 4.

In using the apparatus shown in Figs. 1, 2, and 3 the fuel-chamber is charged with coke or other suitable carbonaceous material, which is brought to a state of incandescence by a blast of air introduced into the ash-pit below the grates, and coal of suitable quality is charged into the retorts and the volatile matters driven off by the heat from the gases and products of combustion passing through the chambers 2 and 3. The gases generated in the retorts can be employed for illuminating purposes or can be mingled with the fuel-gases generated in other portions of the apparatus by connecting the outlet-pipe 26 from the retort with the mains 25 from the fixing-chambers or in any other suitable manner. As soon as the charge in the retorts has become sufficiently coked the lower ends of the retorts are opened, if the apparatus shown in Fig. 1 is employed, so that the coke can pass from the retorts to the fire-chamber.

When using the construction shown in Figs. 2, 3, and 4, the charge in the retort is supported by the charge in the fuel-chamber 1, so that as the charge sinks down in the fuel-chamber a new supply will be added from the retort, which will be recharged from time to time from its hopper.

In making fuel-gas steam is introduced below the grate of the fire-chamber by the pipe 23 and is decomposed as it flows up through the incandescent coke in the fire-chamber. As the gases during the upward flow of steam reach the top of the fire-chamber they mingle with gases produced by the volatilization of oil as it flows down along the vanes or baffle-plates in one of the chambers, as 2. These mingled gases then pass up through the other chamber 3, where they become thoroughly commingled and fixed. Each of the chambers is provided at its upper end with a pipe 24 for the introduction of oil and with a conduit 25 for conducting the gases to a place of use or storage. In the operation described the oil-pipe 24 of the chamber 2 would be opened and the outlet-conduit 25 closed, while in chamber 3 the oil-pipe would be closed and the conduit opened. When it is desired to reverse the operation of the producer, the above-described positions of the valves of the oil-feeding pipes and the outlet-conduits are reversed.

In the construction shown in Figs. 2 and 3 and in dotted lines in Fig. 1 the lower end of the coking-retort is not closed, the charge therein being supported by the charge in the fire-chamber and dropping down as the coke is consumed in the fire-chamber.

In the walls of the fixing-chambers are formed openings 27, through which tools can be inserted for cleaning the baffle-plates.

I claim herein as my invention—

1. In a gas-generator, the combination of a fire-chamber or furnace, two chambers or compartments arranged above the fire-chamber and connected thereto and with each other at points above the normal fuel-level, and provided with spirally-arranged passages and pipes for introducing oil into and for conducting gas away from the upper portions of said chambers, substantially as set forth.

2. In a gas-generator, the combination of a fire-chamber, two coking-retorts above the fire-chamber, two chambers each inclosing one of the retorts and provided with spirally-arranged passages, substantially as set forth.

In testimony whereof I have hereunto set my hand.

COMMODORE R. MILLER.

Witnesses:
DARWIN S. WOLCOTT,
F. E. GAITHER.